US00RE43427E

(19) United States
(12) Reissued Patent
Dawiedczyk et al.

(10) Patent Number: US RE43,427 E
(45) Date of Reissued Patent: May 29, 2012

(54) PLUG CONNECTOR WITH MATING PROTECTION

(75) Inventors: Daniel L. Dawiedczyk, Lisle, IL (US); James Duran, Lisle, IL (US); Jay H. Neer, Lisle, IL (US); Cleaver Brinkeroff, Lisle, IL (US)

(73) Assignee: Molex Incorporated, Lisle, IL (US)

(21) Appl. No.: 12/956,529

(22) Filed: Nov. 30, 2010

Related U.S. Patent Documents

Reissue of:
(64) Patent No.: 7,686,622
Issued: Mar. 30, 2010
Appl. No.: 11/998,892
Filed: Dec. 3, 2007

U.S. Applications:
(63) Continuation of application No. 11/245,695, filed on Oct. 7, 2005, now Pat. No. 7,448,897.

(60) Provisional application No. 60/704,698, filed on Aug. 2, 2005, provisional application No. 60/637,013, filed on Dec. 17, 2004.

(51) Int. Cl.
*H01R 12/00* (2006.01)
(52) U.S. Cl. ..... 439/357
(58) Field of Classification Search ..... 439/357, 439/607.22, 607.01, 493, 76.1, 660
See application file for complete search history.

(56) References Cited

U.S. PATENT DOCUMENTS 5,332,397 A * 7/1994 Ingalsbe ..... 439/76.1

* cited by examiner

*Primary Examiner* — Phuong Dinh
(74) *Attorney, Agent, or Firm* — Stephen L. Sheldon

(57) ABSTRACT

A plug connector is disclosed that has a body portion and a circuit card extending forwardly of a mating face of the connector. The circuit card is protected in place by a protective flanges that extends forwardly from the body portion above the circuit card to protect it from stubbing and to provide a means for aligning the plug connector with a receptacle connector.

16 Claims, 7 Drawing Sheets

FIG.4
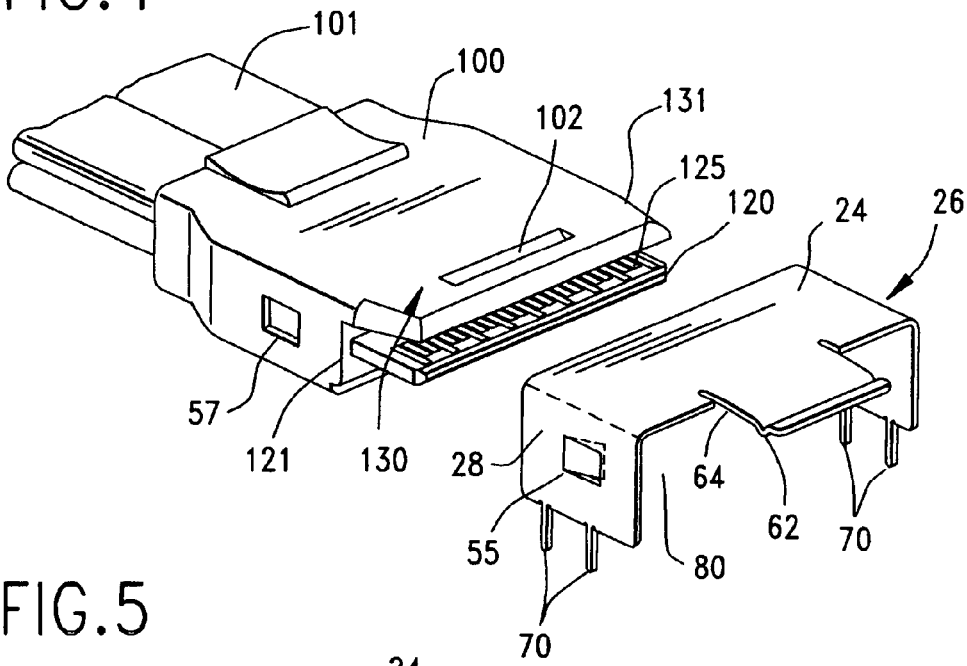
FIG.5
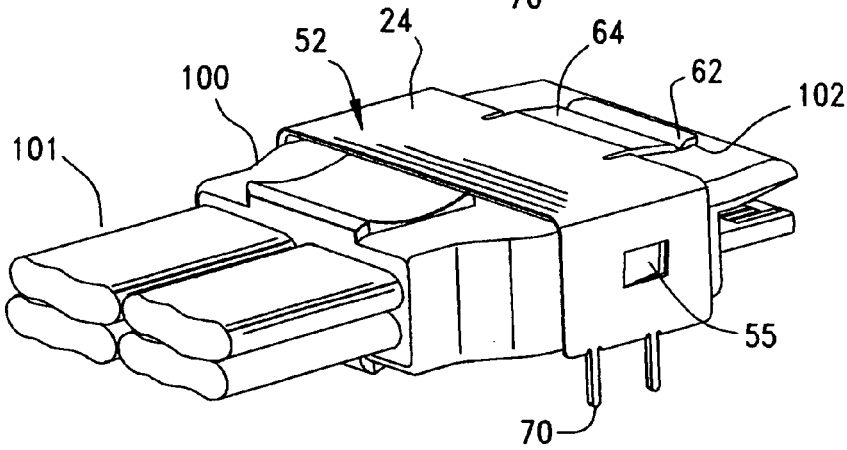
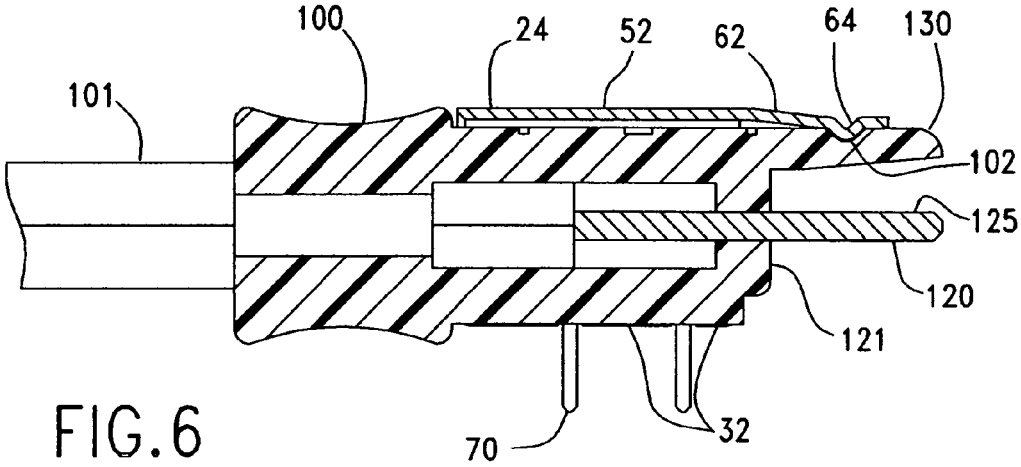
FIG.6

PLUG CONNECTOR WITH MATING PROTECTION

Matter enclosed in heavy brackets [ ] appears in the original patent but forms no part of this reissue specification; matter printed in italics indicates the additions made by reissue.

REFERENCE TO RELATED APPLICATIONS

This application *is a continuation of U.S. application Ser. No. 11/245,695, filed Oct. 7, 2005, now U.S. Pat. No. 7,448,897, which in turn* claims priority of prior U.S. Provisional Patent Application Nos. 60/637,013, filed Dec. 17, 2004 and 60/704,698, filed Aug. 2, 2005.

BACKGROUND OF THE INVENTION

The present invention relates generally to cable connectors, and more particularly to cable connector that mate with circuit board connectors that have a structure which eliminates the need for a shielding cage or guide frame to be utilized with a mating circuit board connector.

It is a common practice in the electronic arts to connect cables to a circuit board by terminating the cables to a connector, typically a plug connector, and then mating the connector to a receptacle connector that is mounted on a circuit board. A well-known problem with connecting cables to circuit board-mounted connectors is the tendency for the cable's weight and movement to loosen the points of attachment of the receptacle connector to the circuit board, thereby breaking signal pathways and causing the circuit board to fail.

This may be prevented by the use of a large guide frame that is mounted to the circuit board to enclose the receptacle connector and which defines an opening into which a plug or similar connector may be inserted. However, such guide frames are large and take up valuable space on the circuit board that could be used for additional circuits or terminations. Additionally, such guide frames are typically die cast and are prone to breakage when dropped.

Problems also arise when mating such plug connectors to their associated receptacle connectors in that in small, confined spaces, it is difficult to orient the plug for proper mating and in small spaces debris and contaminants may easily come into contact with the receptacle connector terminals.

Connector receptacle strain is also a problem and may be caused by the weight, size and movement of the cable(s). Still further, a connector plug and its mating connector receptacle can sometimes be misaligned with respect to each other, needlessly complicating an assembly process and in high-speed connectors, portions of terminals are usually exposed to the exterior of the connector housing, where the terminals may become contaminated. Accordingly, a plug connector which includes means integrated therewith for aligning itself to mate with an opposing connector without occupying much space on a circuit board is desirable.

Accordingly, the present invention is directed to a plug connector that overcomes the aforementioned disadvantages and also provides the aforementioned desired benefits.

SUMMARY OF THE INVENTION

Accordingly, it is a general object of the present invention to provide a plug connector that is guided into engagement with an opposing connector by way of a guide member.

Another object of the present invention is to provide a plug connector that mates to a surface mount receptacle connector, the receptacle connector including a recess disposed along a bottom face thereof and the plug connector having a projecting flange that assists in aligning the plug connector with the receptacle connector and which fits into the receptacle connector recess.

Another object of the present invention is to provide a plug connector for mating with the aforementioned receptacle connector, the plug connector including means for engaging a guide member which aligns and guides the plug connector into mating engagement with the receptacle connector, the plug connector having a mating projection that takes the form of a circuit card and the plug connector further including a pair of protective flanges that are spaced apart from the circuit card and which extend outwardly above and below the circuit card, the plug connector flanges covering opposing surfaces of the receptacle connector and protecting portions of terminals of the receptacle connector which are exposed, from contact by exterior materials, such as contaminants.

Yet a further object of the present invention is to provide a plug connector for use with the aforementioned receptacle connector and guide member, the plug connector including a mating face with forwardly projecting mating blade that fits into a corresponding slot in the receptacle connector, the plug connector further including a projecting tab that extends above and forward of the plug connector mating face, the tab having a recess that receives a corresponding prong, or tab, of the guide member therein and the plug connector tab extending above the housing of the receptacle connector when mated thereto.

A still further object of the present invention is to provide a connector for mating with a receptacle connector mounted to a circuit board, the receptacle connector including a width-wise slot disposed therein, the receptacle connector slot including a plurality of conductive terminals that are supported in place therein by way of exterior slots that receive the terminals, the terminals extending into the slot of the receptacle connector, the connector including an edge card projecting therefrom and received in the slot when the two connectors are mated together, the connector further including a body with at least one flange extending therefrom over the circuit card, the flange extending over portions of at least one set of the terminals of the receptacle connector, the flange including an angled lead-in configuration for guiding the connector into alignment with the receptacle connector, the connector.

Yet still another object of the present invention is to provide a plug connector that mates with a receptacle connector mounted to a circuit board and which first passes through a guide positioned on the circuit board ahead of the receptacle connector, the plug connector having one or more stops extending out from the plug connector body, the lugs engaging corresponding means formed on the guide to limit the insertion travel of the plug connector into the receptacle connector.

The present invention accomplishes these and other objects and aspects by virtue of its structure, which in one principal aspect includes a plug connector with a housing that is insertable into a guide member associated with the receptacle connector and it directs and aligns the plug connector plug with the receptacle connector.

The receptacle connector utilized with the present invention will usually have a body with a card-receiving slot that extends width-wise of the connector body and conductive terminals are inserted into the connector body and contact portions thereof extend into the slot. The plug connector of the present invention include a circuit card, in their preferred embodiments as a mating blade and the circuit card projects from a forward face of the plug connector in order to extend into the slot of the receptacle connector. The receptacle connector may include a recess disposed on its underside, between mounting legs thereof and beneath the card-receiving slot. The plug connector preferably includes a lower, or first flange that extends forwardly from the forward face. This flange is received within the recess and so serves as a guide for properly mating the plug connector to the receptacle connector. The lower flange also preferably has a length sufficient so that it extends at least partly over some of the terminals exposed along a bottom surface of the receptacle connector and serves to protect them from debris an contamination accumulation. The lower flange also preferably has a width that is less than that of the circuit card so the lower flange will not encounter any interference when entering the lower recess defined between the receptacle connector and the circuit board.

In another principal aspect of the present invention, the plug connector includes a housing with a defined mating face from which the circuit card and the first flange project. The first flange may serve as a lower, or bottom, flange of the plug connector which is received within a slot disposed between the opposing receptacle connector and its supporting circuit board so that it serves as a primary guide to guide the plug connector into mating alignment with the receptacle connector. Alternatively, the first flange may serve as an upper flange that contacts the receptacle connector in a manner that it covers portions of the exposed terminals on the upper surface of the receptacle connector.

The guide member that is used with the receptacle connector may also include an extension in the form of a spring arm that extends preferably toward and over the top surface of the receptacle connector plate thereof. A slot, or channel, may be formed on the top surface of the plug connector second flange and this channel, receives a portion of the guide member spring arm, preferably a detent or the like so that an audible or tactile click may be heard or felt when the plug connector properly mated to the receptacle connector. The channel in the top flange assist in keeping the top flange in place over a portion of the top surface of the receptacle connector.

In yet another principal aspect of the present invention, the plug connector body may include one or more features for effecting a secondary alignment between the plug connector and the receptacle connector. These features may take the form of projections, or lugs that are disposed on the outer side surfaces of the plug connector body that engage the guide member and limit the extent to which the plug connector may be pushed into the guide member and receptacle connector.

These and other objects, features and advantages of the present invention will be clearly understood through a consideration of the following detailed description.

BRIEF DESCRIPTION OF THE DRAWINGS

The invention, together with its objects and the advantage thereof, may be best understood by reference to the following description taken in conjunction with the accompanying drawings, in which like reference numerals identify like elements in the figures and in which:

FIG. 4 is an enlarged perspective view taken from the front of the plug connector of FIG. 1 spaced apart from the guide member;

FIG. 5 is an enlarged perspective view taken from the rear of the plug connector of FIG. 4 after the plug connector has been inserted into the guide member;

FIG. 6 is a sectional view of FIG. 5 taken along lines 6-6 thereof;

DETAILED DESCRIPTION OF THE PREFERRED EMBODIMENTS

Figure 1:
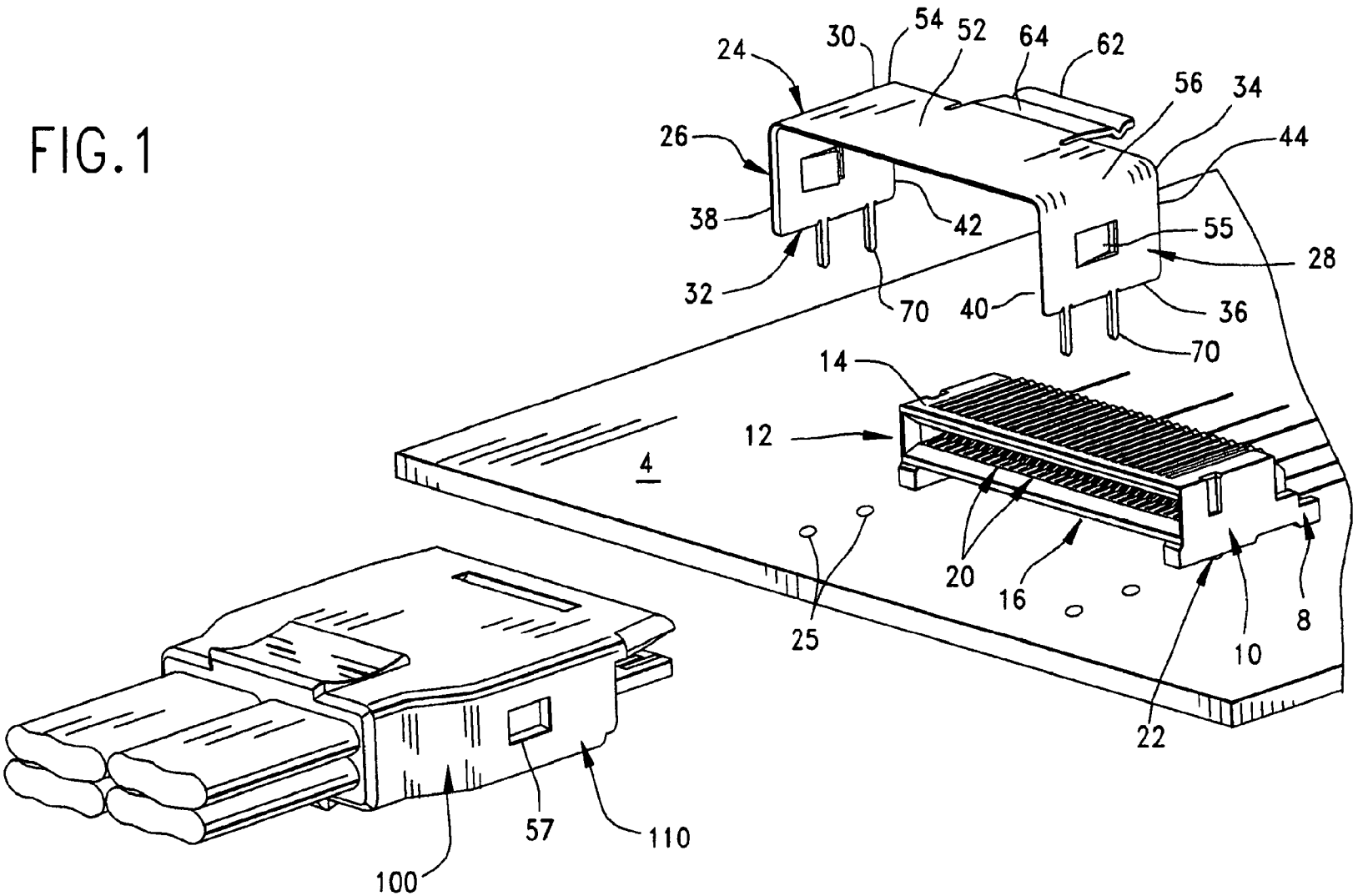
FIG. 1 is an exploded perspective view of an electronics assembly that utilizes a connector guide member in association with a circuit board mounted receptacle connector to align a first embodiment of a plug connector constructed in accordance with the principles of the present invention to the receptacle connector.

FIG. 1 illustrates an exploded view of an electronic assembly 2 used to exchange electrical signals between conductive traces 6 of a circuit board, or other substrate, 4 and electrical conductors in a cable 101. In FIG. 1, the electronic assembly 2 shown includes a circuit board 4 to which electronic components such as integrated circuits, resistors, capacitors inductors and the like can be mounted. As is well-known, electronic components mounted to circuit boards are interconnected by one or more electrically conductive traces 6, at least some of which are located on at least a surface of the substrate 4. Electrical signals may be transmitted through the conductive traces 6 by way of a receptacle connector 8 that is mounted to the substrate 4 and which mates with an opposing cable connector.

FIG. 1 shows the receptacle connector 8 attached to the circuit board 4 using either mounting posts, screws or soldered into place as shown, all of which are well-known in the art. The receptacle connector 8 has two opposing sides 10 and 12, a top 14, a bottom 15, a front 16 and a back 18. The receptacle connector 8 is constructed and arranged to maintain the spacing of several electrical front-side accessible contacts 20, each of which is electrically coupled to a corresponding conductive trace 6 on the circuit board 4.

Electrical and mechanical connection to the front-side 16 accessible contacts 20 in the receptacle connector 8 is made by extending a mating connector of the plug type 100 into contact with the receptacle connector 8. The plug connector 100 has its own set of conductive contacts that are preferably arranged along a mating blade and these contacts mate with the receptacle connector contacts 20. In such an assembly shown in FIGS. 1-6, the plug connector is at least partially guided into place by way of a guide member 24 associated with the receptacle connector 8, and this guide member 24 is preferably mounted to the circuit board 4 in a location that is forward of and spaced apart from the receptacle connector 8. In a preferred embodiment, the guide member 24 is has a general inverted U-shape and is formed as a hood or shield, that is attached to the circuit board 4 by suitable means, such as soldering. The guide member 24 defines a hollow channel 80 through which the plug connector 100 can extend and engage the mating receptacle connector 8.

Figure 2:
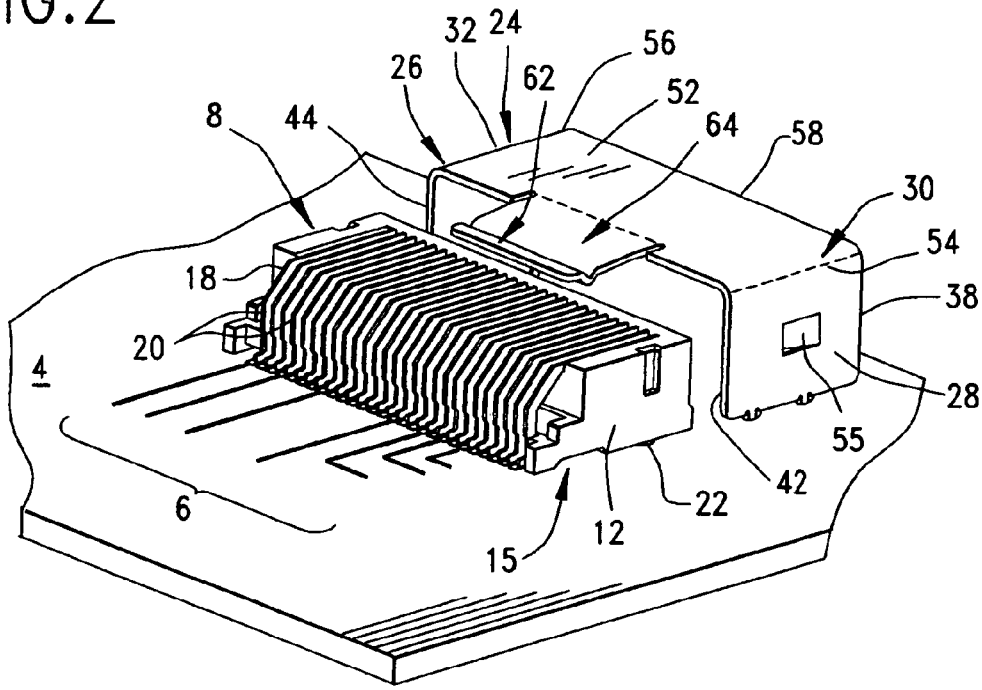
FIG. 2 is a perspective view taken from the rear of the receptacle connector and guide member of FIG. 1, illustrating the environment in which the first embodiment of the invention is utilized.
Figure 3:
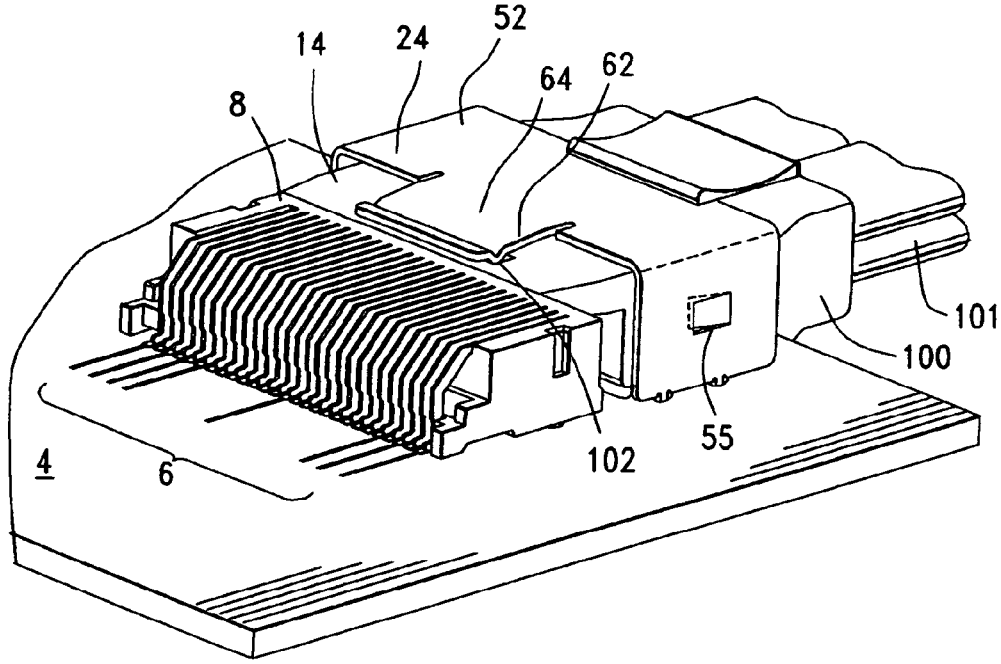
FIG. 3 is the same view shown in FIG. 2, but with the first embodiment plug connector inserted into the guide member and engaged with both the receptacle connector and guide member.

As shown in FIGS. 1-3, the connector guide member 24 preferably includes at least two planar sides 26 and 28. One planar side 26 has a top edge 30 and a bottom edge 32 and the second side 28 also has a top edge 34 and a bottom edge 36. Each planar side 26 and 28 further includes a front edge and a back edge. The first side 26 has a front edge 38 and a back edge 42. The second side 28 has a front edge 40 and a back edge 44. Two mounting posts 70 (FIG. 4) are preferably formed in the guide member along the bottoms of the sides and these posts may be cylindrical or may be stamped as part of the guide member itself. No matter what their structure, the posts 70 extend downwardly from the sides 26 and 28 and are received in mounting holes 25 formed in the circuit board 4. They may be used to solder the guide member in place on the circuit board 4.

As seen in FIGS. 3 & 4, the opposing first and second sides 26 and 28 of the guide member preferably have substantially equal heights 46 between the top and bottom edges and a substantially equal width 48 between the front and back edges of each side. As seen in FIG. 1, the sides 26 and 28 are substantially upright and extend at generally right angles to the planar top 52. Although the preferred embodiment of the guide member 24 is stamped from a single piece of sheet metal, for purposes of this disclosure, the top 52 and the two sides 26 and 28 may also be joined to each other at common edges. The top 52 has a first side edge 54 shown at its right when viewed from the front as in FIG. 1 and a second side edge 56 shown at its left. The top 52 also has a front edge 58 and a rear edge 60.

Typically, the guide member 24 will be stamped and formed from a metal blank by which there is formed an extension of the guide member which takes the form of a tab or spring arm 64 that extends rearwardly. In the drawings, it is shown as extending in a cantilevered fashion, and, it is preferably formed at a slight downward angle that creates a bias or preload in the arm 64. This bias forces a plug engagement portion, shown as ridge or catch 62, located near the distal end of the spring arm 64, into engagement with a corresponding slot or recess 102 that is formed in a corresponding portion of the plug connector.

FIG. 2 is a rear perspective view of the connector receptacle 8 and the relative position of the guide member 24, with respect to the connector plug 8. As shown in FIG. 2, the guide member 24 is mounted to the circuit board 4 so that the guide member 24 is located in a spaced apart fashion from the connector receptacle, i.e., not in contact with it, and in front of the mating face 16 of the receptacle connector 8. FIG. 2 also shows the connective traces 6 on the circuit board 4 and their connection to the electrical contacts 20 of the receptacle connector 8. FIG. 2 also illustrates shows side locking latch or engagement tabs 53 that are formed in the side plates 28 by stamping. These engagement tabs 53 extend inwardly, i.e. into the interior of the channel 80 of the guide member 24 they are sized, shaped and arranged to frictionally contact the sidewalls 110 of the plug connector 100 when the plug 100 is inserted into the guide member 24 and engaged with the receptacle connector 8. As shown in FIG. 1, the plug connector may be provided with openings 57 in its sidewalls into which the guide member engagement tabs 55 catch.

FIG. 3 illustrates a rear perspective view of the electronic assembly of FIG. 1 and showing the circuit board 4, the rear 18 of the receptacle connector 8, the contacts 20 of which establish electrical connections between the board traces 6 and the plug connector wires 101 by way of the plug connector 100 that is installed and latched into place. In FIG. 3, the plug connector 100 of the present invention is shown extending through the guide member 24 until the spring arm catch 62 engages the slot 102 in the top of the plug connector 100. As shown in FIG. 3, this catch is located near the distal end, i.e. the end furthest from the point where the spring arm 64 extends away from the rear edge 60 of the top 52 of the guide member 24. This catch-slot engagement arrangement provides not only an audible engagement "click", but also a tactile click that an assembler can hear and feel when mating the plug connector 100 to the receptacle connector 8.

FIG. 4 shows a front perspective view of the guide member 24 and the relative location of a connector 100 prior to its insertion into the guide member 24. FIG. 4 omits the depiction of the circuit board 4 for clarity. The plug connector 100 is clearly shown to have a connector latch slot 102, cut, molded or otherwise formed in the body of the connector 100 and positioned to accept the catch 62 when the connector 100 is fully engaged with the receptacle connector. It can be seen that the plug connector includes a mating portion, which preferably takes the form of an edge card 120 with a leading edge that extends out from a forward mating face 121 of the plug connector 100.

The edge card 120 has a plurality of conductive traces 125 disposed along its leading edge which are intended to mate with the contacts 20 of the receptacle connector when the plug connector 100 is inserted into the receptacle connector 8. The plug connector housing may also include an extension portion 130 that extends forward from the mating face 121 and over the edge card 120. This extension portion 130 is illustrated as a first flange that also extends widthwise for at least the full width of the edge card 120, and preferably has a width greater than that of the edge card 120. This first flange serves to firstly protect the edge card 120 from stubbing and extends over a portion of the top of the receptacle connector 8 to cover portions of the exposed terminals supported therein. It also provides a support for the recess 102.

It can also be seen best in FIG. 4, that the plug connector flange has angled sides 131 which provide lead in surfaces so that the plug connector 100 may be easily guided into alignment with the receptacle connector by the guide member. The first flange has a length that preferably extends forwardly of the mating face 121 which is greater then the length which the edge card 120 projects from the mating face 121 in order to prevent the contacts on the edge card 120 from contacting the guide member 24 or anything other than the receptacle connector 8.

FIG. 4 also shows a side locking latch 55 formed in one side 28 of the guide member 24. In this embodiment, the side locking latch 55 is formed simply by stamping the metal from which the guide member 24 is formed such that a small tab is formed in the side that extends toward the opposite side 26 and which engages a corresponding side detent 57 formed into a corresponding side of the plug connector 100. When the plug connector 100 is fully engaged with the opposing receptacle connector, the side locking latch 55 (which preferably is formed on both sides 26, 28 of the guide member 24), will engage corresponding detents 57 and "latch" the plug connector 100 in engagement with the receptacle connector 8.

The latching in this embodiment is accompli shed by the guide member 24 and not the receptacle connector 8 so that strain on the assembly induced by the wires 101 is absorbed by the guide member 24 and not by the receptacle connector 8. In addition, any misalignment of the contacts in the plug convector 100 and the receptacle connector 8 is minimized by the plug-to-receptacle alignment function performed by this aspect of the guide member 24.

FIG. 5 is a rear perspective view of the connector 100, fully inserted into the guide member 24. In this figure, the guide member catch 62 is in interlocking engagement with the slot 102 in the connector 100. A deflection or "bias" in the spring arm 64 urges the catch 62 into the engagement slot 102 when the plug connector 100 is fully inserted into the guide member 24. Similarly, the side locking latch 55 (one shown on one side) because it is bent inwardly, may extend into the plug connector recesses 57 to preventing the plug connector 100 from being removed without any significant pull out force. When the plug connector 100 is so connected to the receptacle connector 8, the guide member also provides strain relief and conductor alignment.

FIG. 6 is a partial cutaway view of the connector 100 when installed into the connector alignment guide 24. In this figure, the interlocking engagement of the plug engagement latch 62 is clearly shown on the right-hand side of the drawing. It can be seen that the engagement latch 62, which is biased downwardly and into the connector slot 102, acts to keep the connector 100 within the alignment guide 24. Also shown in this figure are two mounting posts 70 that are connected to the bottom edges 32 of the connector guide sides 26 and 28 and which are used to electrically and mechanically mount the alignment guide 24 to a circuit board or other substrate 4.

Although illustrated in FIGS. 1-6 as being disposed on the top of the plug connector 100, the flange 130 may also be oriented on the bottom of the plug connector mating face 121. In this orientation, the flange will still serve a protective function against stubbing and will also provide an alignment feature in that it will be received within the recess that is formed along the bottom of the receptacle connector 8 beneath the edge card-receiving slot of the receptacle connector 8.

Figure 7:
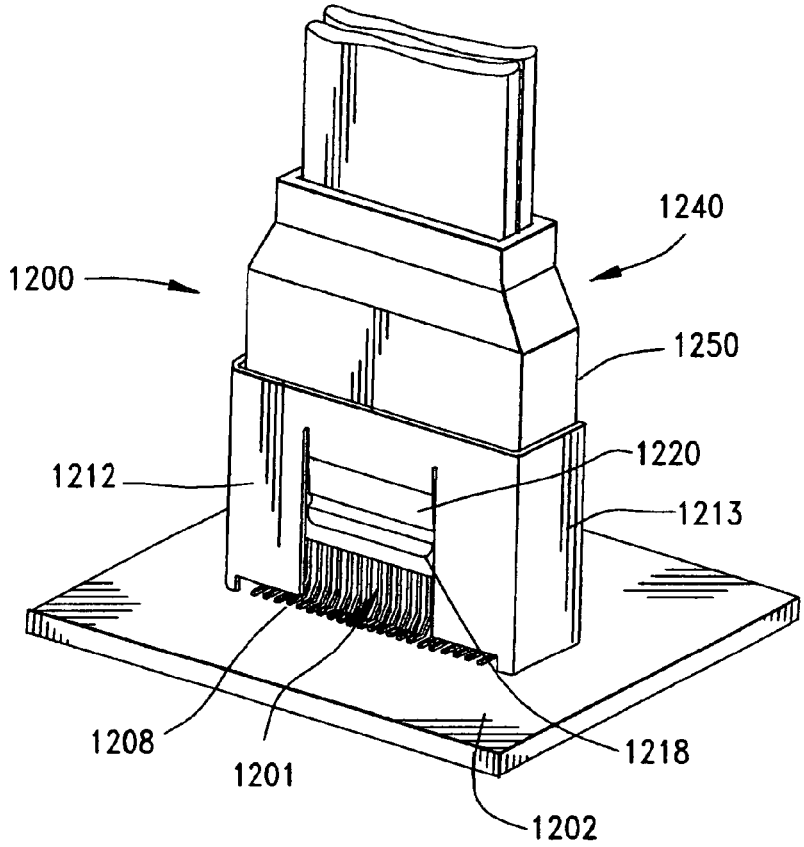
FIG. 7 is a perspective view of an alternate embodiment of a vertical guide member that is used is conjunction with a vertical, surface-mounted receptacle connector.
Figure 8:
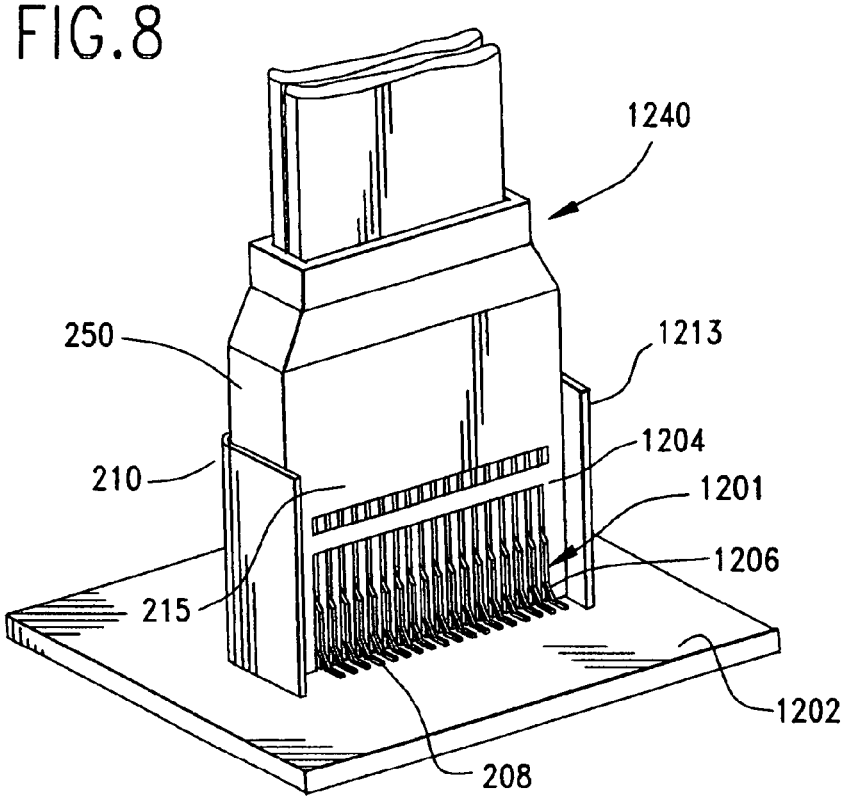
FIG. 8 is the same view as FIG. 7, but taken from the opposite side thereof.

FIGS. 7 & 8 illustrate another embodiment 200 of a plug connector constructed in accordance with the principles of the present invention and which is intended for a vertical use on a circuit board. As shown in the Figures, the receptacle connector 201 is one that is surface-mounted in a vertical format to a circuit board 202. The connector 201 has an insulative housing 204 and supports a plurality of conductive terminals 206. The terminals 206 have tail portions 208 that are soldered to pads or traces on the surface of the circuit board 202. A conductive guide member 210 is provided for use with the connector 202 and it can be seen that the guide member 210 may have a general U-shape with a top plate 212 that has two side plates 213 that extend therefrom transversely. These three plates cooperatively define a channel 215 which extends partially around and above the receptacle connector 201. The top plate 212 of the guide member is slotted and has a recess 218 into which a catch member 220 extends. This catch member has a bend 221 formed in it that preferably engages a slot (not shown) on the plug connector housing 250 in the same manner as shown for the first embodiment.

In this embodiment, the plug connector 240 is for the most part merely oriented in a vertical direction and has an insulative housing 250 from which an edge card and a first flange extend. The first flange extends partially over the exposed terminals of the receptacle connector 201 and it has a slot that is intended to engage the catch member 220 of the vertical guide member.

Figure 9:
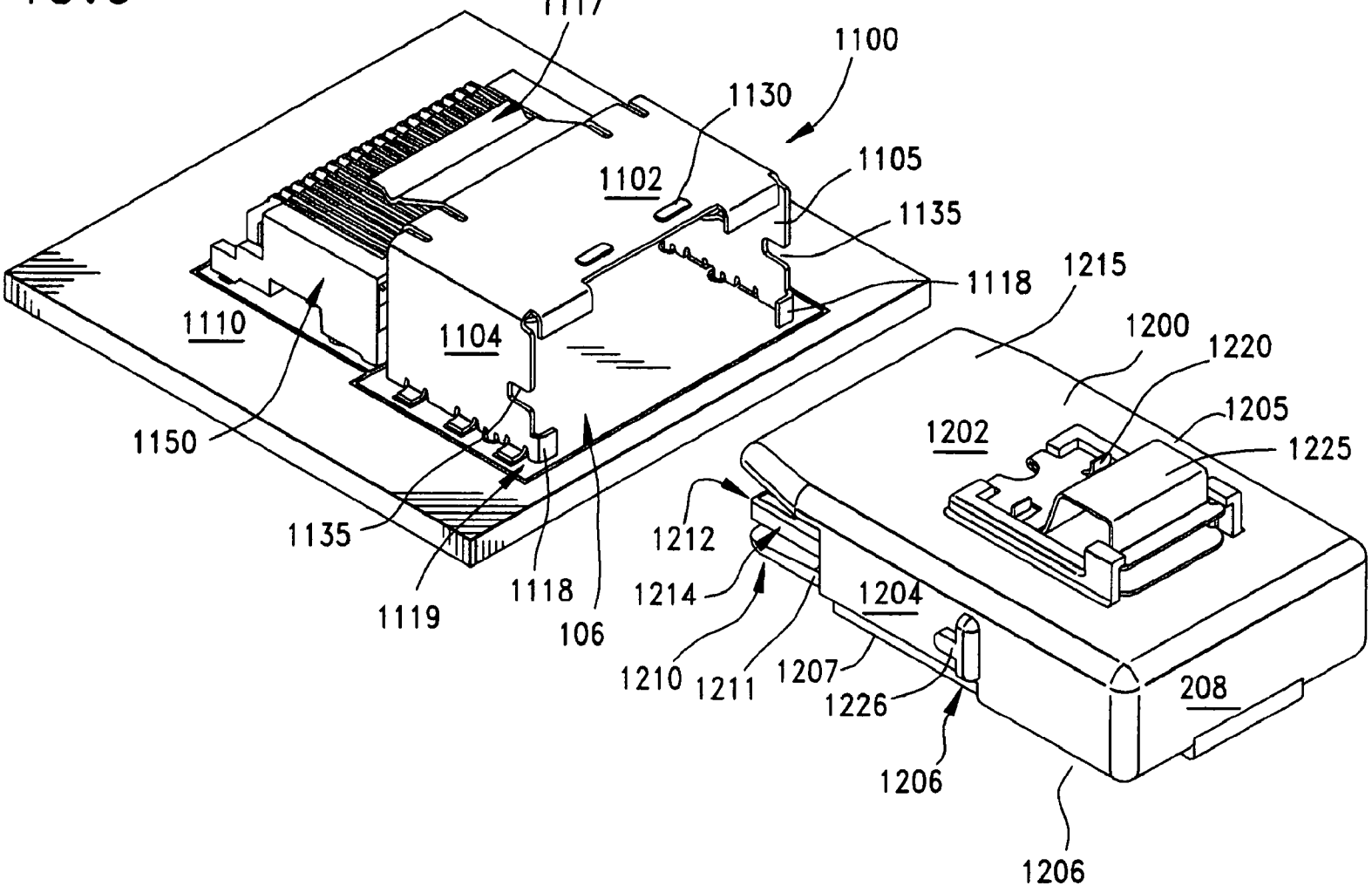
FIG. 9 is a is a perspective view of a receptacle connector and associated shroud, or guide member with a second embodiment of a plug connector constructed in accordance with the principles of the present invention spaced apart from and in alignment with the receptacle connector.
Figure 10:
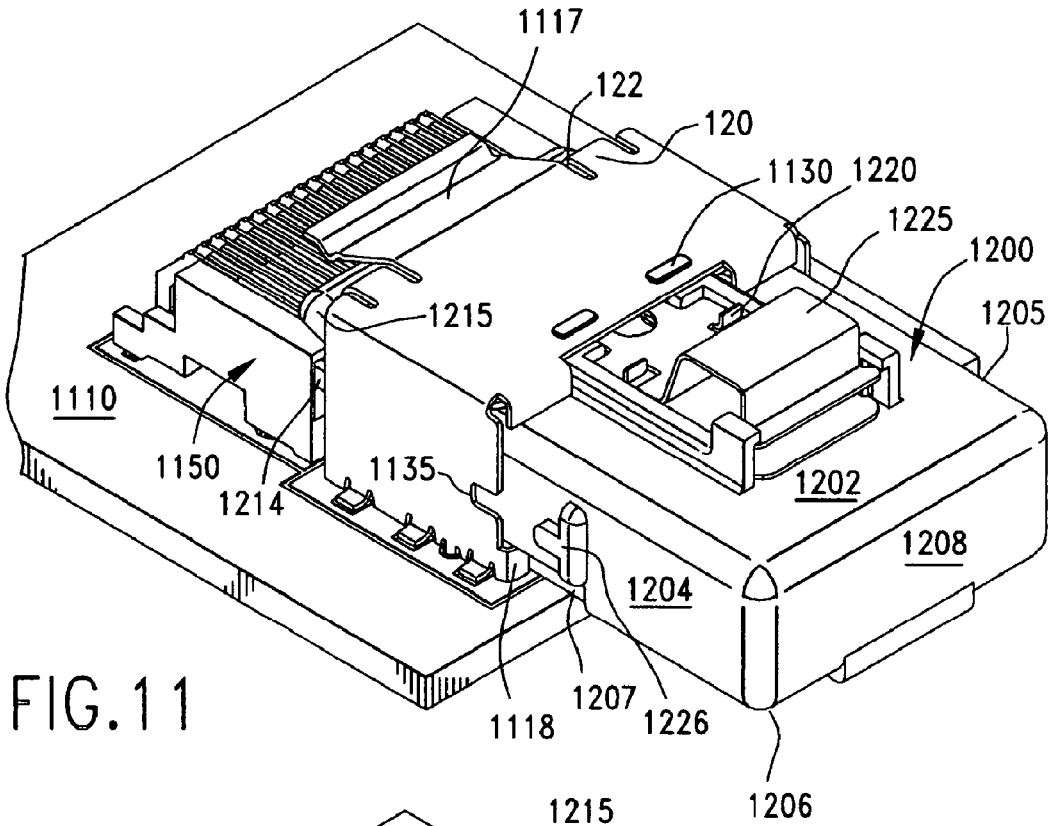
FIG. 10 is the same view as FIG. 9, but with the plug connector partially inserted into the shroud.

FIG. 9 illustrates another electronic assembly in which another embodiment of a plug connector constructed in accordance with the principles of the present invention the invention is illustrated. In this assembly a shroud (or guide member) 1100 is shown as having a top wall 1102 that interconnects two spaced-apart sidewalls 1104, 1105. The shroud 1100 has a general inverted U-shape, when viewed from an end, and is placed on a circuit board 1110 spaced apart from a receptacle connector 1150 that is mounted to the circuit board 1110. The receptacle connector 1105 is similar in shape and from to the receptacle connector 8 described and shown in FIGS. 1-6 above and includes an opening or recess along its bottom face underneath its card-receiving slot and beneath the bottom surface of the receptacle connector 1105. The slot receives the leading edge of the circuit card that is used in the plug connector 1200 as the blade portion thereof. The shroud 1100 provides a hollow channel 1106 that may guide the plug connector 1200 into engagement with the circuit board connector 1150.

The shroud 1100 also serves to retain the plug connector 1200 in place after mating. In this regard, the shroud 1100 includes an elongated extension 1117 that extends forwardly of the top wall 1102 of the shroud and it may further preferably include one or more alignment slots 1135 that are disposed in the sidewalls 1104, 1105 of the shroud 1100 and which extend longitudinally forwardly, the purpose of which shall be explained in more detail below. Additional means 1119 for guiding the plug connector 1200 may also be provided on the shroud 1100, and make take the form of tabs 1118 that are bent inwardly and extend for a predetermined distance from the sidewalls 1104, 1105.

Figure 11:
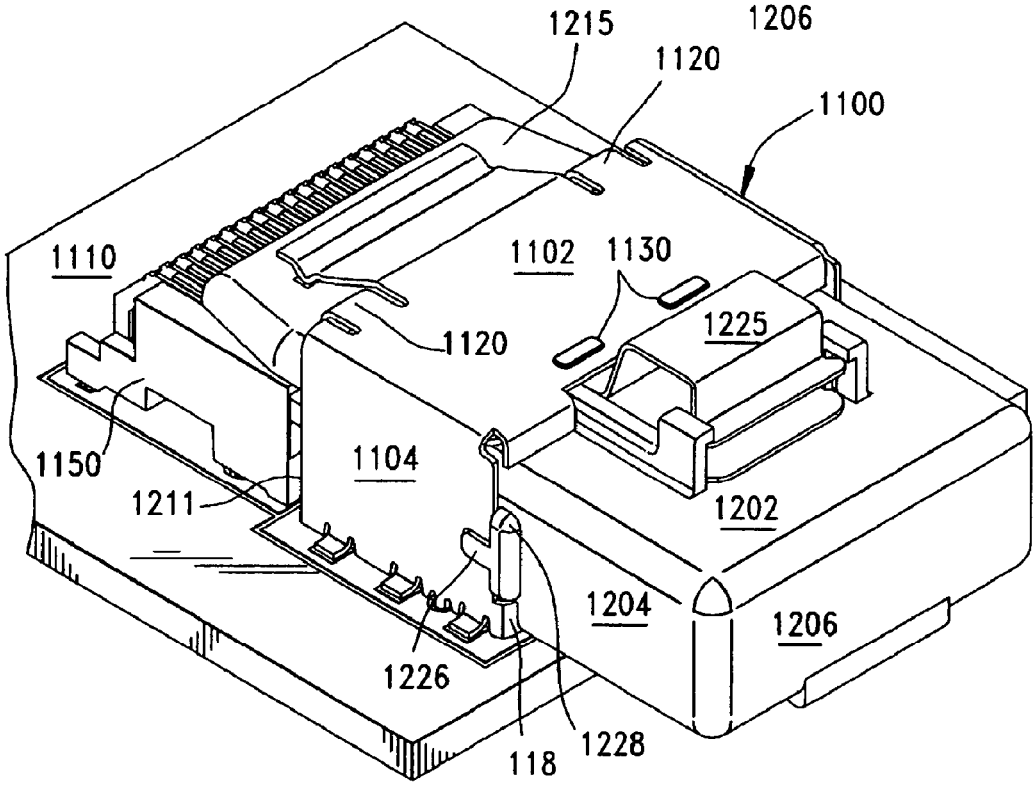
FIG. 11 is the same view as FIG. 10, but with the plug connector fully engaged in the shroud and in mating engagement with the receptacle connector.
Figure 12:
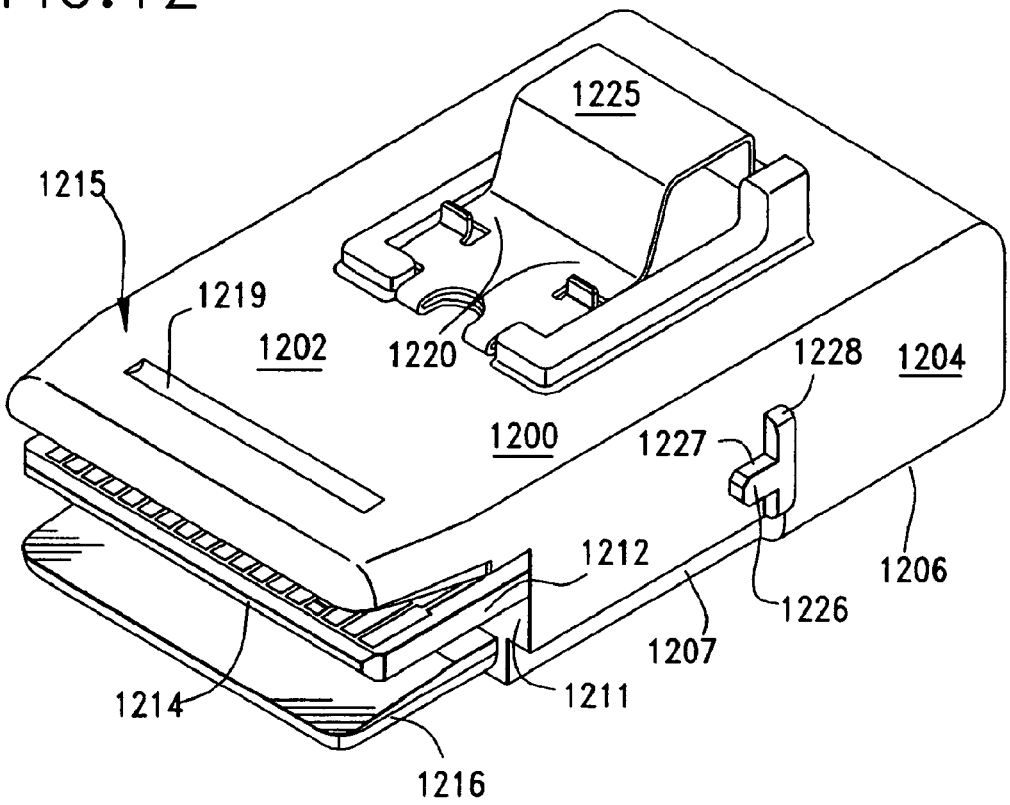
FIG. 12 is a perspective view of the plug connector of FIG. 9, taken from the front thereof.

The plug connector 1200, as best illustrated in FIG. 12, has a generally polygonal structure, and is shown in the drawings as generally a solid rectangle with a top surface 1202, two side walls 1204, 1205, a bottom surface 1206 and a rear surface 1208. Cables will usually exit from the rear surface 1208 of the plug connector, but they have been omitted from the drawings for clarity. The front end 1210 of the connector defines a mating end of the plug connector 1200 and in applications such as shown in FIGS. 9-12, the plug connector 1200 preferably includes a forward mating face 1211 includes a forwardly projecting mating blade 1212, typically in the form of a leading edge of a circuit card 1214. The top surface 1202 (and in the drawings, bottom surface 1206) may have an extension 1215 in the form of a first flange that extends forwardly from the forward face 1211, and which is located above and spaced apart from the circuit card 1212. Another extension is also preferably present in this embodiment, and as shown best in FIGS. 12 & 13, this extension takes the form of a second flange 1216 that likewise extends forwardly from the forward face 1211 and which is located below and spaced apart from the circuit card 1214 and the first flange 1215. In this type of arrangement, the two flanges 1215, 1216 may be considered as "flanking" the circuit card 1212.

The shroud press tab 1117 is bent downwardly to impart a slight bias to it so that it will slidingly or abuttingly contact the top surface 1202 of the mating connector 1200, and in particular, the top extension 1215 thereof. This type of engagement is shown in FIG. 11, and the top flange 1215 may be provided with a transverse slot or recess 1214, that is spaced a specific distance from the leading end of the top flange 1215 so that it will engage the detent portion of the shroud press tab 1117. This engagement serves to assist in retention of the plug connector 1200 in mating engagement with the receptacle connector 1150 and also assist the operator in knowing the engagement between the two connectors 1200, 1150 is complete. The press tab 1117 with its downward bias will "click" into the recess 1214 in both an audible and tactile manner so the operator will not only feel the engagement, but also "hear" the engagement.

As mentioned above, the shroud 1100 may also include a pair of alignment slots 1135 that are formed in the shroud sidewalls 1104, 1105 and preferably along the outwardly facing edges thereof. These notches 1135 engage corresponding structure, shown as lugs 1226 that are formed on the exterior of the plug connector housing 1200. These lugs 1226 have an overall T-shape when viewed from the side, with a center leg 1227 that is received within the corresponding shroud alignment slot 1135 and two other legs that form a base 1228 that is perpendicular to the center leg 1227. The base 1228 serves as a stop when it abuts the edge of the sidewalls 1104, 1105. With the present invention, the tabs 1118 of the shroud 100 are received in notches 1207 that extend lengthwise along the plug connector exterior and these tabs 1118 and notches 1207 serve to first orient and position the plug connector 1200 in the interior of the shroud 1100, and the notches 1135 and lugs 1226 cooperate to secondly orient the circuit card 1212 of the plug connector 1200 in opposition to card-receiving slot of the receptacle connector 1150.

The present examples and embodiments therefore are to be considered in all respects as illustrative and not restrictive. The invention should not be limited to the details given herein but is instead defined by the claims set forth below.

The invention claimed is:

1. A plug connector for connecting to a mating receptacle connector mounted to a circuit board and spaced apart from a metal enclosure, that serves, at least in part to direct the plug connector into mating engagement with the mating receptacle connector, comprising:

a connector body, the connector body having top and bottom surfaces and a pair of spaced-apart side surfaces;

a circuit card supported within the connector body, the circuit card including a leading edge with contacts for mating with said mating receptacle connector, the circuit card leading edge extending outwardly from the plug connector, and said circuit card having a preselected width;

a first flange extending alongside said circuit card, the first flange being spaced part from said circuit card and said first flange having a width that is less than the width of said circuit card so that it may be received in a recess on said mating receptacle connector; and, a pair of engagement members respectively disposed on the connector body side surfaces for orienting said plug connector in opposition to said mating receptacle connector.

2. The plug connector of claim 1, wherein the engagement members include recesses which receive complimentary shaped engagement members of said metal enclosure.

3. The plug connector of claim 1, wherein said first flange is disposed below said circuit card.

4. The plug connector of claim 3, wherein said first flange fits underneath a bottom of said mating receptacle connector when said said plug is mated thereto.

5. The plug connector of claim 1, wherein said engagement members include lugs that fit into slots of said metal enclosure.

6. The plug connector of claim 1, further including a second flange spaced apart from said circuit card and from said first flange.

7. The plug connector of claim 6, wherein the second flange has a width that is different than said first flange width.

8. The plug connector of claim 7, wherein said second flange width is larger than said circuit card width.

9. The plug connector of claim 7, wherein said second flange width is larger than said first flange width.

10. A plug connector for connecting to a mating receptacle connector mounted to a circuit board, comprising:

a connector body;

a circuit card supported within the connector body, the circuit card including a leading edge with contacts for mating with said mating receptacle connector, the circuit card leading edge extending outwardly from the connector body, and said circuit card having a preselected width;

a first flange spaced part from said circuit card in a first direction, the first flange having a preselected width; and, a second flange spaced apart from said circuit card in a second direction opposite the first direction and including a first and second edge that define a width that is different than the first flange width, the second flange being substantially continuous between the first and second edge.

11. The plug connector of claim 10, wherein the second flange width is larger than said circuit card width.

12. The plug connector of claim 10, wherein said second flange width is larger than said first flange width.

13. The plug connector of claim 10, wherein said first flange width is less than the circuit card width so that it may be received in a recess on said mating receptacle connector.

14. The plug connector of claim 10, wherein said first flange is disposed beneath said circuit card and said second flange is disposed above said circuit card.

15. The plug connector of claim 10, wherein the first flange is defined by a third and fourth edge and the first flange is substantially continuous between the third and fourth edge.

16. A plug connector for connecting to a mating receptacle connector mounted to a circuit board, comprising:

a connector body;

a circuit card supported within the connector body, the circuit card including a leading edge with contacts for mating with said mating receptacle connector, the circuit card leading edge extending outwardly from the connector body and having a first preselected width;

a first flange spaced part from said circuit card in a first direction, the first flange having a second preselected width defined by a first and second edge, the first and second edge not having additional flanges located along either the first and second edge; and a second flange spaced apart from the circuit card in a second direction opposite the first direction, the second flange including a third and fourth edge that define a width that is larger than the first flange width.

* * * * *